United States Patent
Thompson, III

(10) Patent No.: US 9,651,000 B2
(45) Date of Patent: May 16, 2017

(54) EXHAUST MANIFOLD AIR INJECTION DEVICE

(76) Inventors: Albert S. Thompson, III, Weatherford, TX (US); Deanna Thompson, legal representative, Abilene, KS (US)

( * ) Notice: Subject to any disclaimer, the term of this patent is extended or adjusted under 35 U.S.C. 154(b) by 757 days.

(21) Appl. No.: 13/819,915

(22) PCT Filed: Aug. 29, 2011

(86) PCT No.: PCT/US2011/049557
§ 371 (c)(1),
(2), (4) Date: Jun. 3, 2013

(87) PCT Pub. No.: WO2012/030722
PCT Pub. Date: Mar. 8, 2012

(65) Prior Publication Data
US 2014/0345260 A1    Nov. 27, 2014

Related U.S. Application Data

(60) Provisional application No. 61/379,010, filed on Sep. 1, 2010.

(51) Int. Cl.
| F01N 1/00 | (2006.01) |
| F02M 25/07 | (2006.01) |
| F01N 3/22 | (2006.01) |
| F01N 3/30 | (2006.01) |
| F01N 3/34 | (2006.01) |
| F02M 26/73 | (2016.01) |
| F02M 26/70 | (2016.01) |

(52) U.S. Cl.
CPC ........... *F02M 25/0793* (2013.01); *F01N 3/22* (2013.01); *F01N 3/227* (2013.01); *F01N 3/30* (2013.01); *F01N 3/34* (2013.01); *F02M 26/70* (2016.02); *F02M 26/73* (2016.02); *Y02T 10/20* (2013.01)

(58) Field of Classification Search
CPC .............................. F01N 3/30; F02M 25/0793
See application file for complete search history.

(56) References Cited

U.S. PATENT DOCUMENTS

| 2,854,816 | A | * | 10/1958 | Bodine, Jr. | ..................... 60/275 |
| 2,954,793 | A | * | 10/1960 | Seeler | ...................... A62B 9/02 137/102 |
| 3,158,142 | A | * | 11/1964 | Bradshaw | ............ F01M 13/023 123/572 |
| 3,253,401 | A | * | 5/1966 | Wells | .............................. 60/298 |

(Continued)

*Primary Examiner* — Kenneth Bomberg
*Assistant Examiner* — Jason Sheppard
(74) *Attorney, Agent, or Firm* — Reising Ethington P.C.

(57) ABSTRACT

A device (10) for introducing air into a combustion chamber of an internal combustion engine (11) through an exhaust manifold (14) of the engine includes a generally cylindrical valve body (12) supportable at an inner axial end in a hole formed through an engine exhaust manifold wall (13). A main fluid pathway (16) is formed within the valve body and extends between an intake (18) adjacent an outer axial end of the valve body and an exhaust opening (20) at the inner axial end of the valve body. A one-way check valve (22) is carried in the main fluid pathway and is configured to allow fluid flow along the main fluid pathway from the intake toward the exhaust opening and to block fluid flow along the main fluid pathway from the exhaust opening toward the intake.

13 Claims, 2 Drawing Sheets

(56) References Cited

U.S. PATENT DOCUMENTS

| | | | | |
|---|---|---|---|---|
| 3,314,230 | A | * | 4/1967 | Vanderpoel .................... 60/293 |
| 3,630,197 | A | * | 12/1971 | Hirano ................ A61M 16/208 |
| | | | | 128/204.26 |
| 5,189,877 | A | | 3/1993 | Wells et al. |
| 6,739,293 | B2 | | 5/2004 | Turner et al. |
| 8,671,976 | B2 | * | 3/2014 | Park .................... F04B 27/1009 |
| | | | | 137/543.19 |
| 2007/0063489 | A1 | * | 3/2007 | Dinsdale ................ B60R 21/26 |
| | | | | 280/728.2 |
| 2010/0076499 | A1 | | 3/2010 | McNamara et al. |
| 2011/0146635 | A1 | * | 6/2011 | Zeitoun .................. F02M 26/14 |
| | | | | 123/568.11 |

\* cited by examiner

EXHAUST MANIFOLD AIR INJECTION DEVICE

TECHNICAL FIELD

This invention relates generally to an exhaust manifold air injection device for introducing air into a combustion chamber of an internal combustion engine through an exhaust manifold of the engine.

BACKGROUND OF THE INVENTION

U.S. Pat. No. 5,189,877 issued Mar. 2, 1993 and assigned to the assignee of the present invention, discloses an exhaust manifold air injection device for introducing air into a combustion chamber of an internal combustion engine through an exhaust manifold of the engine. The device includes a generally cylindrical valve body that's adapted to be mounted in an engine exhaust manifold. A fluid pathway is defined within the valve body and extends between an intake and an exhaust opening of the valve body. A one-way check valve is carried in the fluid pathway and is configured and positioned to allow fluid flow from the intake toward the exhaust opening and is further configured to prevent fluid flow from the exhaust opening toward the intake.

INVENTION SUMMARY

An exhaust manifold air injection device (10) for introducing air into a combustion chamber of an internal combustion engine (11) through an exhaust manifold (14) of the engine is provided. The device (10) comprises a valve body (12) supportable at an inner axial end in a hole formed through an engine exhaust manifold wall (13), and a main fluid pathway (16) formed within the valve body and extending between an intake (18) adjacent an outer axial end of the valve body and an exhaust opening (20) at the inner axial end of the valve body. The device (10) also comprises a one-way check valve (22) carried in the main fluid pathway (16) and configured to allow fluid flow along the main fluid pathway (16) from the intake (18) toward the exhaust opening (20) and to block fluid flow along the main fluid pathway (16) from the exhaust opening (20) toward the intake (18).

The main fluid pathway (16) may be defined by a generally straight axial bore (17) extending between the intake (18) and the exhaust opening (20). The straight axial bore promotes laminar fluid flow and low turbulence, but more importantly, when compared to other bore options such as a larger-volume counterbore, the use of a straight bore allows fluid to be drawn in at a higher mass flow rate via a vacuum pulsed fluid flow through the valve body.

The intake (18) may also include an array of circumferentially-spaced intake openings (42) that extend and provide fluid communication between the main fluid pathway (16) and an ambient air mass. These radially-arrayed intake ports allow the device (10) to increase the mass inflow rate of captured air because they are positioned to more readily take advantage of ambient air flows impacting the intake from different directions.

BRIEF DESCRIPTION OF THE DRAWINGS

These and other features and advantages of the invention will become apparent to those skilled in the art in connection with the drawings, in which.

DETAILED DESCRIPTION OF INVENTION EMBODIMENT(S)

Figure 1:
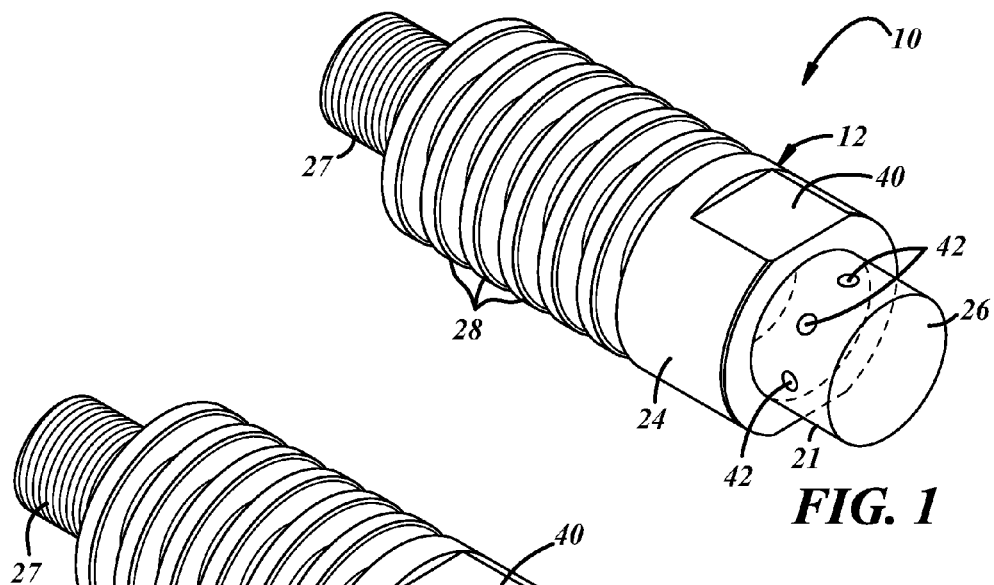
FIG. 1 is an orthogonal view of an exhaust manifold air injection device.

An exhaust manifold air injection device for introducing air into a combustion chamber of an internal combustion engine (generally indicated at 11) through an exhaust manifold 14 of the engine 11 is generally shown at 10 in FIGS. 1-4. The device 10 may include a generally cylindrical valve body, as is generally indicated at 12, and may be supportable at an inner axial end in a hole formed through an engine exhaust manifold wall 13. The device 10 may also include a main fluid pathway 16 formed within the valve body 12 and extending between an intake 18 disposed adjacent an outer axial end of the valve body 12 and an exhaust opening 20 disposed adjacent the inner axial end of the valve body 12. The main fluid pathway 16 is included to provide fluid communication through the device 10 between the exhaust manifold 14 and an ambient air mass.

Figure 3:
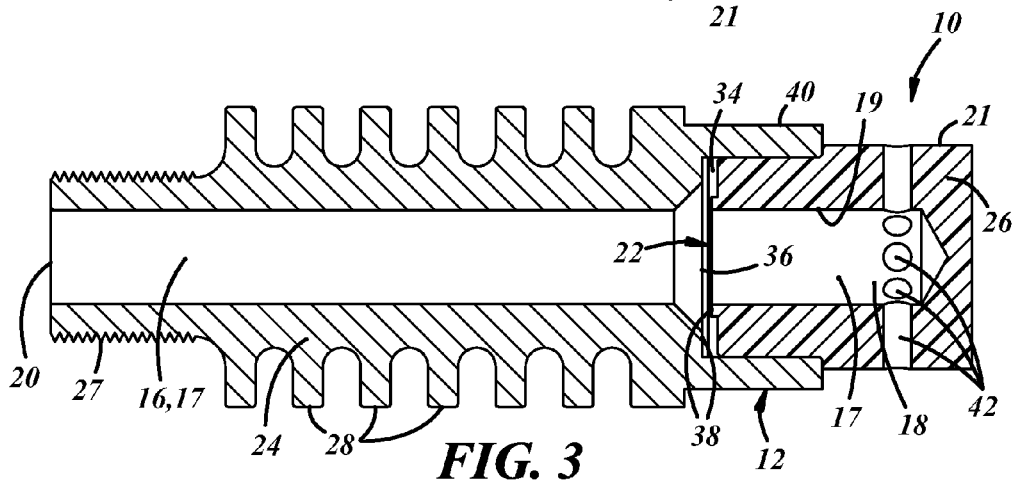
FIG. 3 is a cross sectional front view of the device of FIG. 1.
Figure 4:
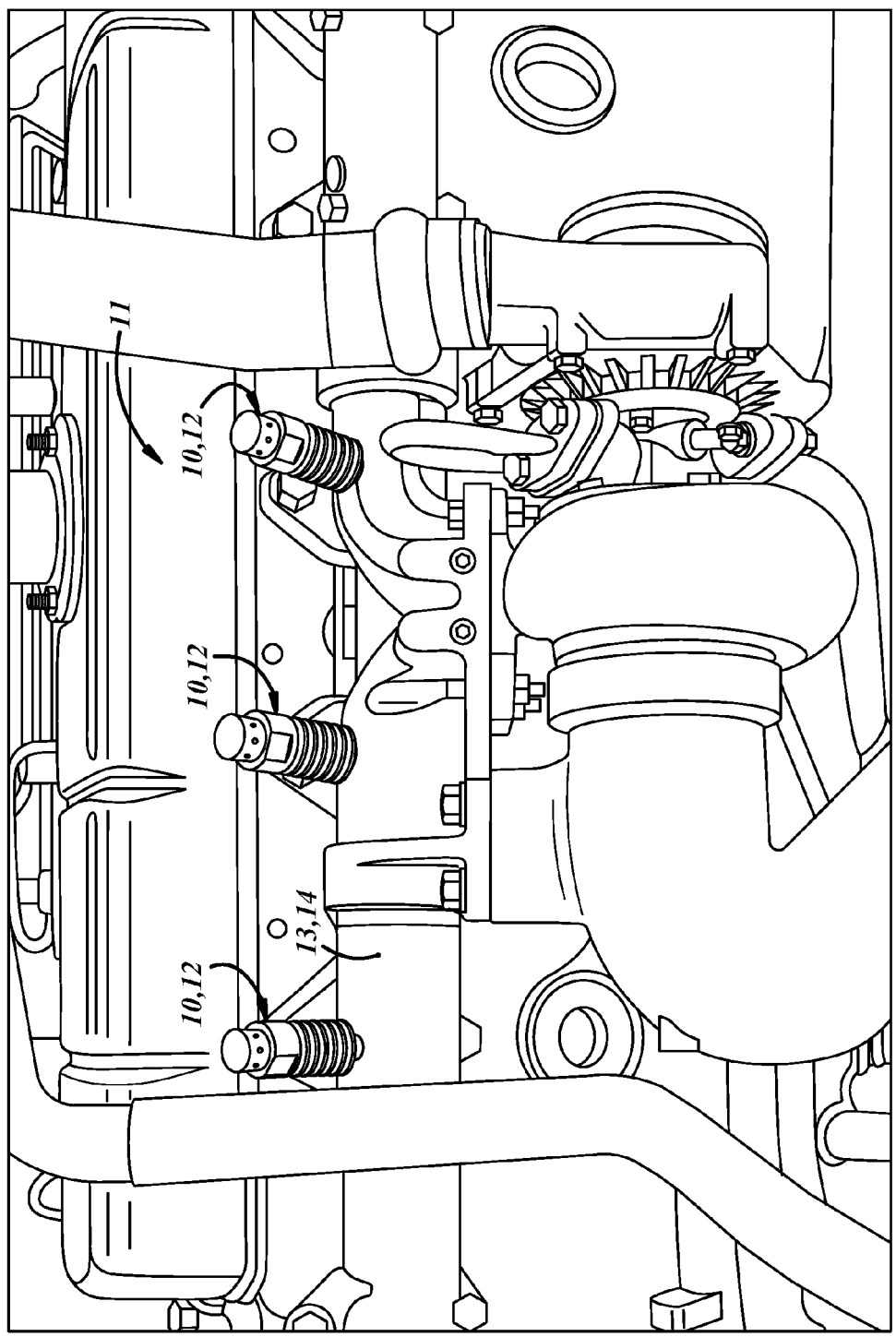
FIG. 4 is a perspective view of the device of FIG. 1 shown installed in an engine exhaust manifold along with two other such devices.

As best shown in FIG. 3, the device 10 may also include a one-way check valve generally indicated at 22 carried in the main fluid pathway 16 and configured to allow fluid flow along the main fluid pathway 16 in an inward direction from the intake 18 toward the exhaust opening 20 and to block fluid flow along the main fluid pathway 16 in an outward direction from the exhaust opening 20 toward the intake 18. When the gas pressure within the exhaust manifold 14 is less than approximately 1 atmosphere (1 atm.=101,325 Pa. or 14.696 psi), the valve 22 opens and unblocks the main fluid pathway 16, permitting air to be drawn inward into the exhaust manifold 14 through the device 10. During a pressure stroke of the engine 11, when gas pressure within the exhaust manifold 14 is greater than approximately 1 atm., the valve 22 closes and blocks the main fluid pathway 16, blocking the flow and, consequently, the outward movement and escape of exhaust gases from the exhaust manifold 14 through the device 10. When the check valve 22 is open, the added air is drawn through the exhaust manifold 14 into a combustion chamber of the engine 11 where the added air allows for a more complete burn of whatever fuel has been provided in the combustion chamber.

The main fluid pathway 16 may be defined by a straight axial bore 17 that may extend from the intake 18 to the exhaust opening 20. In other words, the bore 17 may be a passage of generally constant cross-section relative to, and extending along, the axis of the device 10. Should the bore 17 be circular in cross-section, it may have a generally constant diameter throughout its length. The bore 17 may also include one or more cuts that depart from the bore's generally consistent cross-section and have shapes suitable to accommodate the seating of a check valve diaphragm 36, as is described in detail below.

Figure 2:
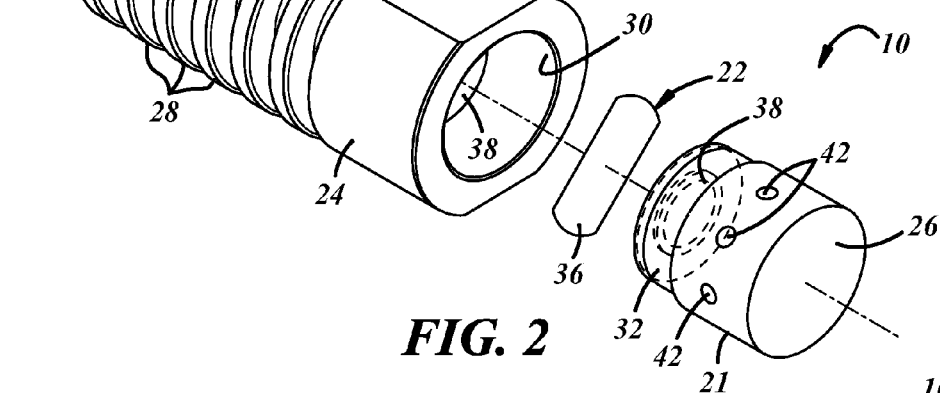
FIG. 2 is an orthogonal exploded view of the device of FIG. 1.

As best shown in FIGS. 1-3, the valve body 12 may include a generally cylindrical axially inner main body portion 24 inter-connectable with a generally cylindrical axially outer end cap body portion 26. The inner end of the valve body 12 may include threads 27 configured to allow for threaded engagement with a threaded hole formed through a wall 13 of an exhaust manifold 14 of an engine 11.

The main body portion 24 of the valve body 12 may include the threaded axially inner end of the valve body 12 and may also include a series of six annular cooling ribs 28. The ribs 28 may extend radially and integrally outward from spaced locations along an outer circumferential wall of the main body portion 24. Other embodiments may include other suitable numbers and configurations of cooling ribs 28 and other suitable cooling means as are known in the art.

As best shown if FIG. 2, an axially outer end of the main body portion 24 may include a cylindrical inner engagement wall 30. The inner engagement wall 30 may be shaped to receive in press-fit engagement a cylindrical outer engagement wall 32 formed on an axially inner end of the outer end cap body portion 26.

As best shown in FIG. 3, the outer end cap body portion 26 and the main body portion 24 cooperate to define a check valve chamber 34 that carries a check valve diaphragm 36. This check valve diaphragm 36 may be sized and shaped to optimize sensitivity to changes in the differential between gas pressure within the exhaust manifold 14 and ambient. The check valve diaphragm 36 may be comprise a flat sheet of metal or other suitable material bounded by two parallel straight edges and two opposing rounded edges that are defined by respective curves slightly tighter than that of an inner circumference of the check valve chamber 34. Check valve diaphragm thickness may also be optimized to prevent flexing that might jam the check valve diaphragm 36 within the check valve chamber 34 in either the open or closed position. The check valve chamber 34 may include valve seats 38 comprising narrow annular rims to minimize the surface area contacted by the check valve diaphragm 36 in its open and/or closed positions. Minimizing the surface area contacted will minimize any inclination the check valve diaphragm 36 might have to stick due to fouling. In other embodiments, however, any suitable one-way valve configuration may be used. Other embodiments may include additional or alternative means of preventing the check valve diaphragm 36 from sticking, such as cutting grooves or slots into parts of the valve diaphragm 36, adding ripples or protrusions into an inner surface of the check valve chamber 34, or using various rectangular, elliptical, or spherical valve shapes.

As best shown in FIGS. 1 and 2, diametrically-opposed portions of the main body 24's outer axial end may be flattened to provide surfaces where tools can grip and manipulate the device 10. In other words, flats 40 may be formed in diametrically opposite locations in an outer circumference of the outer axial end of the main body portion 24 to accommodate the grip of a tool used to threadedly engage the threads 27 of the device 10 in a threaded hole formed in an exhaust manifold 14.

Shown best in FIG. 3, the intake 18 may be formed in the end cap body portion 26 and may include an array of circumferentially-spaced intake openings 42 extending radially and providing fluid communication between the main fluid pathway 16 and an ambient air mass, i.e., between an inner cylindrical wall 19 of the portion of the bore 17 included in the end cap body portion 26 and an outer cylindrical wall 21 of the end cap body portion 26. The array of intake openings 42 may be disposed adjacent the outer axial end of the valve body 12. Although the drawings show fluid communication between the intake openings 42 and the main fluid pathway 16 to be unobstructed, other embodiments may include a suitable cellulose, sponge, and/or synthetic fiber web that may be carried by the end cap 26 between the intake openings 42 and the main fluid pathway 16 in a position to filter incoming air. Other embodiments may include a mechanism for adjusting the air flow through the air injector. Other embodiments may also include a removable version of the end cap body portion 26 configured such that removal of the end cap body portion 26 allows access to a filter or air flow adjustment mechanism for replacement or for cleaning of any accumulated contaminants that may be fouling the filter.

The main body portion 24 and cap body portion 26 of the valve body 12 may be made using numerical control (NC) machines or any other suitable automated or manually operated machine tool system. The main body portion 24 and cap body portion 26 may then be mechanically pressed together with the check valve diaphragm 36 positioned between portions of the main body portion 24 and cap body portion 26 that cooperate to form the check valve chamber 34. In the present embodiment the diaphragm 36 comprises 17 7 CH900 stainless steel and both the main and the cap body portions 24, 26 of the valve body 12 comprise 304 stainless steel. In other embodiments, the diaphragm 36, and the main and cap body portions 24, 26 of the valve body 12 may comprise any suitable materials or combinations of materials.

In practice, an air injection device 10 may be installed via the following steps: First, a 7/16" hole may be drilled in the exhaust manifold 14 of an engine 11 such that an axis of the hole is preferably less than or equal to 45° from vertical orientation. The hole may then be threaded with a ¼" pipe tap. An anti-seizing compound may then be applied to the threads of the air injection device 10. The air injection device 10 may then be threaded into the hole with a wrench or socket. The engine 11 may then be started and the injection device 10 checked for leaks. The injection device 10 may then be further tightened if necessary to eliminate leaks.

The addition of an air injection device to an engine exhaust manifold increases engine efficiency and power and reduces pollutant emissions by providing sufficient additional air to burn fuel recovered from exhaust backwash that would otherwise create a sub-optimal fuel-air mixture in an engine's combustion chamber. The addition of such a device constructed as described above will improve on these effects in that the use of a straight axial bore will enable a higher rate of pulsed fluid flow by reducing turbulence introduced by a stepped-bore configuration. In addition, the use of a radial array of intake openings is better able to exploit ambient air currents within an engine compartment than a single-directional intake. The press-fit between the main body and end cap prevents leakage and loosening that might occur with a screw-fit, and the use of a smaller check valve disk improves check valve sensitivity to pressure changes and prevents distortion-induced jamming.

This description, rather than describing limitations of an invention, only illustrates an embodiment of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. An exhaust manifold air injection device (10) for introducing air into a combustion chamber of an internal combustion engine (11) through an exhaust manifold (14) of the engine, the device comprising:

a valve body (12) supportable at an inner axial end in a hole formed through an engine exhaust manifold wall (13) and having an inner main body portion (24) at an outer axial end;

an end cap body portion (26) interconnected with the inner main body portion (24) and having an intake (18), said intake comprising an end cap axial bore and an array of circumferentially-spaced intake openings (42) that extend radially and provide fluid communication between the end cap axial bore and an ambient air mass;

a main fluid pathway (16) formed within the valve body (12) and extending between the intake (18) adjacent the outer axial end of the valve body and an exhaust opening (20) at the inner axial end of the valve body;

a one-way check valve (22) carried in the main fluid pathway (16) and configured to allow fluid flow along the main fluid pathway from the intake (18) toward the exhaust opening (20) and to block fluid flow along the main fluid pathway (16) from the exhaust opening (20) toward the intake (18); and the main fluid pathway (16) being defined by a straight axial bore extending between the intake (18) and the exhaust opening (20), the bore comprising a cross-sectional area at the exhaust opening (20) no smaller than a cross-sectional area of the end cap axial bore.

2. An exhaust manifold air injection device (10) as defined in claim 1 in which the valve body (12) includes threads (27) at its inner axial end.

3. An exhaust manifold air injection device (10) as defined in claim 1 in which the outer end cap body portion (26) and main body portion (24) of the valve body (12) cooperate to define a valve chamber (34) that carries a check valve diaphragm (36).

4. An exhaust manifold air injection device (10) as defined in claim 1 in which the outer axial end of the main body portion (24) includes a cylindrical inner engagement wall (30) shaped to receive in press-fit engagement a cylindrical outer engagement wall (32) formed on an axial inner end of the outer end cap body portion (26).

5. An exhaust manifold air injection device (10) as defined in claim 1 in which flats (40) are formed in diametrically opposite locations in an outer circumference of the outer axial end of the main body portion (24).

6. An exhaust manifold air injection device (10) as defined in claim 1 in which the array of intake openings (42) is disposed adjacent the outer axial end of the valve body (12).

7. An exhaust manifold air injection device (10) as defined in claim 1 in which the main body portion (24) of the valve body (12) includes a series of cooling ribs (28) disposed at spaced locations along the main body portion.

8. An exhaust manifold air injection device (10) as defined in claim 7 in which the cooling ribs (28) are generally annular in shape and extend radially outwardly from spaced locations along an outer circumferential wall of the main body portion (24).

9. An exhaust manifold air injection device (10) for introducing air into a combustion chamber of an internal combustion engine (11) through an exhaust manifold (14) of the engine, the device comprising:

a valve body (12) supportable at an inner axial end in a hole formed through an engine exhaust manifold wall (13) and having an inner main body portion (24) at an outer axial end;

an end cap body portion (26) interconnected with the inner main body portion (24) and having an intake (18), said intake comprising an end cap axial bore;

a main fluid pathway (16) formed within the valve body (12) an extending from the intake (18) adjacent the outer axial end of the valve body and an exhaust opening (20) at the inner axial end of the valve body; and a one-way check valve (22) carried in the main fluid pathway (16) and configured to allow fluid flow along the main fluid pathway from the intake (18) toward the exhaust opening (20) and to block fluid flow along the main fluid pathway from the exhaust opening toward the intake;

wherein the intake (18) includes an array of circumferentially-spaced intake openings (42) that extend radially, and provide fluid communication, between the end cap axial bore and an ambient air mass.

10. An exhaust manifold air injection device (10) as defined in claim 9 in which intake openings (42) extend radially from an inner cylindrical wall (19) of the end cap axial bore to an outer cylindrical wall (19) of the end cap body portion.

11. An exhaust manifold air injection device (10) as defined in claim 9 in which the array of intake openings (42) is disposed adjacent the outer axial end of the valve body (12).

12. An exhaust manifold air injection device (10) as defined in claim 9 in which the main fluid pathway (16) is defined by a straight axial bore (17) extending between the intake (18) and the exhaust opening (20) the bore comprising a cross-sectional area at the exhaust opening (20) no smaller than a cross-sectional area of the end cap axial bore.

13. An exhaust manifold air injection device (10) as defined in claim 12 in which the valve body (12) includes threads (27) at its inner axial end.

* * * * *